United States Patent [19]

Brandl et al.

[11] 4,270,623

[45] Jun. 2, 1981

[54] TRACTOR HOOD

[75] Inventors: Michael C. Brandl, Westmont; David T. Kataoka, Berwyn; Jagdish C. Khanna, Downers Grove; Frank J. Zwettler, Jr., Bollingbrook, all of Ill.

[73] Assignee: International Harvester Company, Chicago, Ill.

[21] Appl. No.: 5,050

[22] Filed: Jan. 22, 1979

[51] Int. Cl.³ .............................................. B62D 25/10
[52] U.S. Cl. ............................... 180/69 R; 180/89.17; 312/345; 312/348
[58] Field of Search ................ 180/69 R, 69 C, 89.17, 180/89.18; 312/348, 341 R, 345; 308/3.6, 3.8; 296/100, 102, 103, 99

[56] References Cited

U.S. PATENT DOCUMENTS

| 1,321,859 | 11/1919 | Streich | 312/348 R X |
|---|---|---|---|
| 1,569,010 | 1/1926 | Geimer | 312/348 R |
| 3,487,887 | 1/1970 | Pensa | 180/69 C |
| 3,658,394 | 4/1972 | Gutner | 308/3.6 |
| 3,995,927 | 12/1976 | Stein | 312/348 R X |
| 4,119,377 | 10/1978 | Barber et al. | 308/3.6 X |

FOREIGN PATENT DOCUMENTS 955990 10/1974 Canada .................................... 312/345

Primary Examiner—John J. Love
Assistant Examiner—D. W. Underwood
Attorney, Agent, or Firm—Ronald C. Kamp; F. David AuBuchon

[57] ABSTRACT

In a tractor having a hood and a frame with a latch to establish a closed position of the hood on the frame, the present invention includes a frame track and a hood track secured to the frame and hood respectively, a pair of hood guides secured to the hood and movable in the frame track, a pair of frame guides secured to the frame and movable in the hood track and a mechanism for automatically rigidly connecting the hood to the frame in the closed position.

4 Claims, 6 Drawing Figures

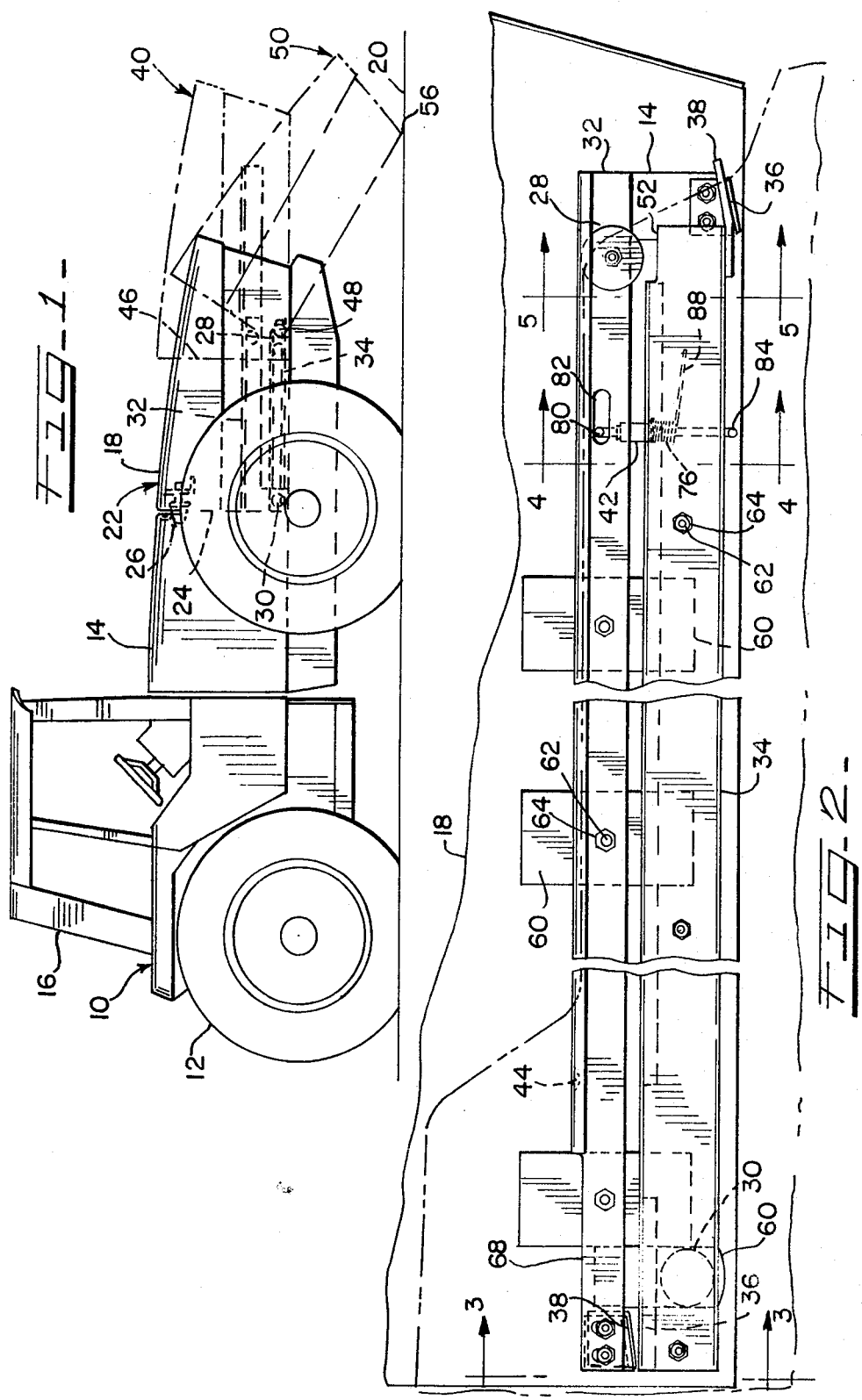

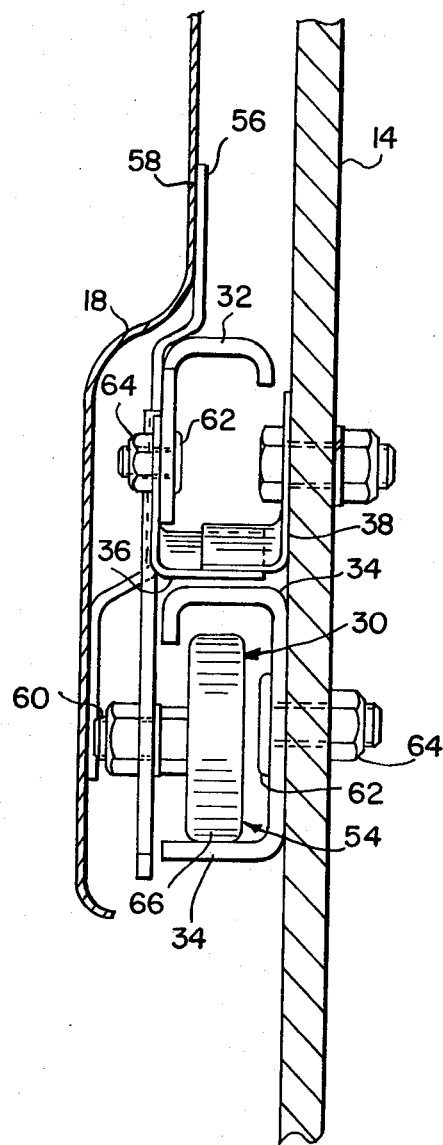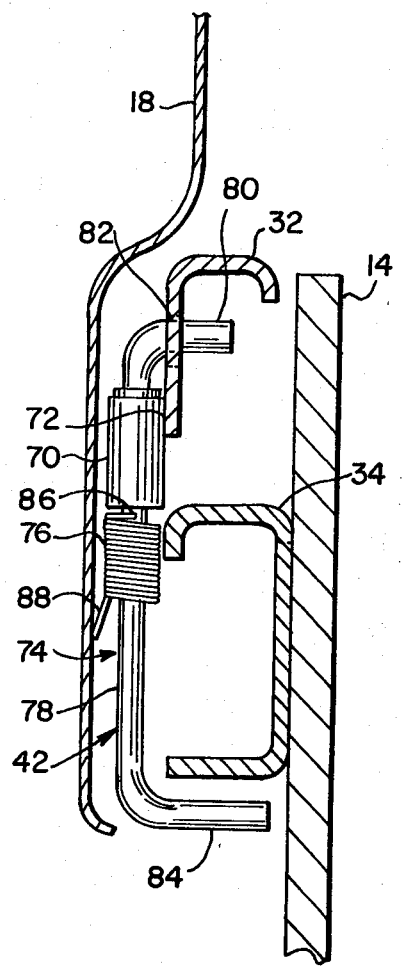

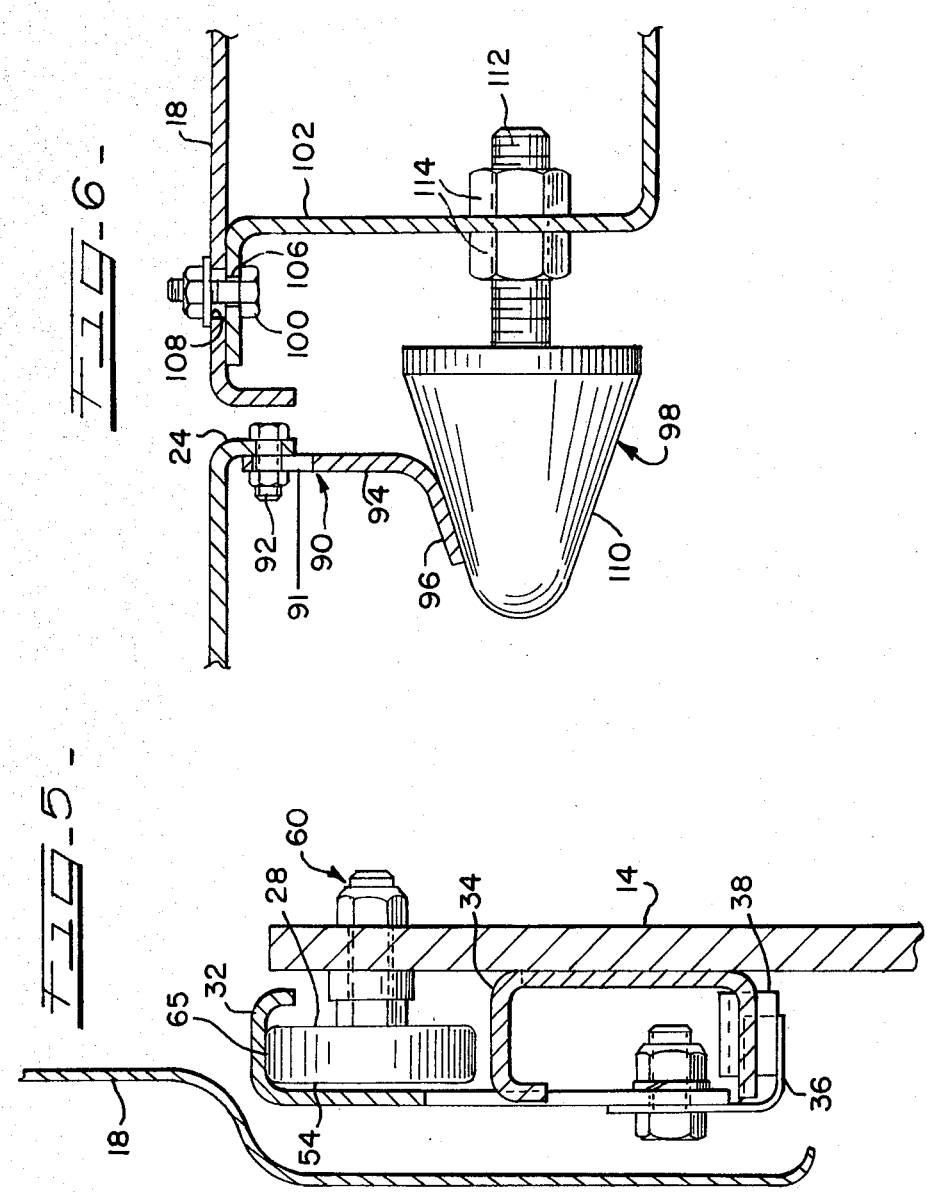

TRACTOR HOOD

BACKGROUND OF THE INVENTION

This invention relates generally to tractors and more particularly concerns the connecting mechanism used to secure the hood of the tractor to the frame of the tractor.

The hoods on both construction and farm tractors are required to protect the components located under them from damage due to the debris in the environment in which they work. It would also act as an insulating element to reduce the noise produced by the components located on the hood.

To accomplish these goals the conventional hood is a substantial structure in both its size and weight. It is also substantial that the hoods have traditionally been rigidly secured to the frame of the tractors by devices such as nuts and bolts and have become assemblies of similarly rigidly secured sections which permit the individual serving and particular element located under the hood to remove a single section without having to manipulate the entire hood. The difficulty with these traditional configurations is that they require tools to remove either the entire hood or sections of the hood as well as either extremely strong individuals to remove the hood or a mechanical device to assist the individual in the removal.

One solution to the traditional problem is presented by the structure in U.S. Pat. No. 3,487,887, but this solution also still leaves a plurality of problems unsolved. The first problem of this patented solution is that the hood cannot be completely detached from the frame without mechanical assistance. The second problem of this arrangement is that the stays, 12, interfere with individual servicing the element position under the hood. With the final problem being the noise produced by the vibration of the hood during the operation of the vehicle.

It is, an object of the present invention to provide a mechanism to secure the hood to the vehicle frame that permits the partial or complete removal of the hood without the need for tools or mechanical lifting devices.

Moreover, it is an object of the present invention to provide such a mechanism which will also produce unrestricted access to the components position under the hood in both the partial and complete removal position.

Finally it is an object of the present invention to provide such a mechanism which will not be a source of vibration caused sound.

SUMMARY OF THE INVENTION

In a tractor having a hood and frame with a latch to establish a closed position of the hood, the present invention includes a frame track and a hood track secured to the frame and hood respectively, a pair of hood guides secured to the hood and moveable in the frame track, a pair of frame guides secured to the frame and moveable in the hood track and a mechanism for automatically rigidly connecting the hood to the frame in said closed position.

BRIEF DESCRIPTION OF THE DRAWINGS

Other objects and advantages of the invention will become apparent upon reading the following detail description and upon reference to the drawings, in which:

FIG. 1 is a right side view of a tractor incorporating the hood securing mechanism of the present invention;

FIG. 2 is an exploded view of the hood securing mechanism of the present invention along the centerline of the tractor;

FIG. 3 is a sectional view along lines 3—3 of FIG. 2;

FIG. 4 is a sectional view along line 4—4 of FIG. 2;

FIG. 5 is a sectional view along line 5—5 of FIG. 2; and

FIG. 6 is a sectional view of the centering device of the present invention.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAIL DESCRIPTION OF THE INVENTION

Turning first to FIG. 1 there is shown a tractor 10 with its wheels 12 supporting the tractor frame 14 upon which is mounted the cab 16 and the hood 18. The hood encloses a plurality of components such as the engine air cleaner and the radiator. These components need periodic maintenance as well as occasional major repair.

To provide access to these components without requiring the manual or mechanical manipulation of the entire mass of the hood 18, the hood securing mechanism of the present invention creates four positions for the hood in which the hood is either partially or completely supported by the tractor frame the ground 20 or both the tractor frame and the ground.

The first of these positions is the closed position 22 shown in solid line in FIG. 1. The hood is held in a substantially fixed fore and aft position with respect to the vertical surface 24 of the frame by a conventional latching mechanism, Atwood Vacuum Machine Company latch part number RE-5711-48, which can be controlled by either a knob in the cab or at the front of the tractor through a Bowden wire connection and a bell crank (not shown). The preferred embodiment incorporates an indexing mechanism 26 which aligns the surfaces of the hood 18 and the frame 22 in the closed position.

When the hood is in the closed position, the frame guide 28 the hood guide 30, the hood track 32 and the frame track 34 cooperate with the hood ramps 36 and frame ramps 38 (see FIG. 2) to rigidly secure the hood 18 to the frame 14 both vertically and sidewardly.

In keeping with the preferred embodiment the operator can move the hood to the primary open position 40 by releasing the hood latch, neutralizing the stop mechanism 42 (see FIG. 2) and moving the hood forward until the frame guide 28 engages the detent 44 of the hood tract 32. The downward force on the hood produced by gravity stops the forward motion of the hood when the detent 44 engages the frame guide 28 and prevents further forward rolling engagement. With the hood in the primary open position the operator has unobstructed access to the components positioned between the vertical surface 24 of the frame and the rearward surface 46 of the hood 18.

Should the operator need to acquire access to the components which still remain under the hood in the primary position 40 he can overcome the detent 44 by slightly elevating the rear portion of the hood while moving it forward. He can then move to the front of the hood, continue to move the hood forward until it freely pivots downwardly about the pivot 48 established by the contact between the hood guide 30 and the frame track 34. During this manipulation of the hood the operator never carries the full weight of the hood because it is at all times supported by the guides and tracks, or the guides or tracks and the ground. With the hood in the secondary position 50 the operator now has unobstructed access to the component between the pivot 48 and the vertical surface 24 of the frame 14. However, should the operator still require unobstructed access to the components located forward of the pivot 48, he need only move the hood guide through the front cutout 52 in the frame track 34 by rotating the hood about its pivot 56 which is a contact point when the hood 18 and the ground 20. Since the pivot 56 supports a substantial portion of the weight of the hood during this operation, it will be apparent that the operator can acquire unobstructed access to the components located forward of the vertical surface 24 of the frame 14 without resorting to mechanical assistance to move and remove the hood.

Turning now to FIGS. 2, 3 and 5 it will be seen that the frame guide 28 and the hood guide 30 are conventional rollers 54 which are secured to the frame 14 and mounting plate 56, which is welded to the hood 18 at 58, by the traditional threaded shaft nut and sleeve arrangement 60. Since the preferred embodiment incorporates identical pairs of the hood guides the frame guides, the hood tracks, the frame tracks and the ramp sets, the description of these elements will be restricted to the element on the left side of the tractor.

FIGS. 2 and 3 also show that the hood track 32 and the frame track 34 are both secured to the mounting plate and frame, respectively, by weld bolts 62 and nuts 64. With the frame guide 28 being positioned above and forward of the hood guide 30, the frame guide 28 will contact the inner surface 65 of the hood track while the hood guide 30 will contact the lower inner surface 66 of the frame track as gravity applies a downward force on the hood.

Since the hood guide and hood track move with the hood the weight of the hood will be fully supported by the contact between the hood and frame guides and tracks until the hood is moved beyond the primary open position 40 and the frame guide 28 enters the rear cutout 68 of the hood track 32. When the frame guide 28 enters the cutout 68, the front of the hood can be rotated downward to contact the ground thereby establishing the secondary open position 50. In this secondary opening position the frame ramp 38 acts as a stop to keep the hood guide 30 in contact with the frame track 34. The geometry with its resulting engagement of the track and guide of the preferred embodiment also play a part in the establishment of the primary open position 40 and the creation of a rigid connection between the frame and hood and the closed position. As the hood approaches the closed position, the frame ramps 38, which are positioned above the hood ramps 36, engage the hood ramps. When the hood is in the closed position the sliding contact between the frame ramp 38 and hood ramps 36 increases the engaging force between the tracks and guides of the hood and frame, thereby eliminating vibration of the hood during operation of the vehicle by transforming the rolling engagement between the tracks and guides into a rigid connection.

The preferred embodiment also provides a stop mechanism 42 which limits the forward motion of the hood. After the operator has disengaged the latch mechanism and has started to move the hood forward, he must manually disengage the lock mechanism 42 or he will be unable to move the hood to the primary open position. The lock mechanism 42 is shown in FIGS. 2 and 4 and consists of a sleeve 70 which is welded at 72 to the hood track 32, a rod 74 rotatably mounted in the sleeve 70 and a coil spring 76 secured to the rod 74. The rod is substantially C-shaped with the sleeve and spring being positioned along its vertical length 78. The upper extension 80 above the rod 78 extends through the stop slot 82 and the hood track 32. The lower extension 84 of the rod protrudes below the frame track 34. The upper extension 80 is held in position by the interaction of the connection of the spring 76 at 86 to the rod 74 and the contact between the hood 18 and the spring extension 88. Since the stop mechanism will abut the hood guide 28 when the hood is moved a short distance forward, the operator must manually rotate the lower extension 84 toward the front of the tractor before he initiates the forward motion of the hood. This rotation will cause the upper extension 80 of the stop mechanism 42 to pass through the stop slot 82 thereby allowing the hood to move to the primary open position.

The final feature of the preferred embodiment is the inclusion of the indexing mechanism 26 and the hood mounting arrangement. As shown in FIG. 6 an indexing plate 90 in slot 91 is secured by nuts and bolts 92 to the forward surface 24 of the frame. The indexing plate 90 has a vertical section 94 and a downwardly sloping section 96. The downwardly sloping section 96 contacts a probe 98 which is adjustably connected by nuts, bolts and washers 100 via probe plate 102 to the hood 18. The adjustability of the mounting plate is achieved by having a properly sized aperture 106 in the probe plate 102 and an overside aperture 108 in the hood. A probe 98 includes a conical element 110 and a threaded element 112, with additional adjustability via possible by the use of two nuts 114 to secure the threaded element 112 to the probe plate 102. The indexing mechanism is used to align the hood frame and the latch as the hood approaches the closed position 22. The adjustability of the index plate and the probe ensure alignment of these elements which are subject to extreme manufacturing tolerance build-ups as a result of the size and number of parts which secure the hood to the frame.

Thus it is apparent that there has been provided, in accordance with the invention, a tractor hood that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. In a tractor having a hood and frame with a latch to establish a closed position of said hood, the improvement, including in combination:
    at least two frame tracks secured to opposite sides of said frame;
    at least two hood tracks secured to opposite sides of said hood;

at least two hood guides secured to opposite sides of said hood, said hood guides engaged with and movable on said frame tracks;

at least two frame guides secured to opposite sides of said frame and located at opposite ends of said hood from said hood guides when said hood is in said closed position, said frame guides engaged with and movable on said hood tracks; and a first set of at least two ramps secured to said hood and a second set of at least two ramps secured to said frame, said second set slideably engaging said first set when said hood is in said closed position to automatically rigidly connect said hood to said frame by increasing the engaging force transmitted between said guides and said tracks, with one ramp from each set of said ramps in close horizontal proximity to each of said guides when said hood is in said closed position.

2. The invention of claim 1, wherein:

said hood and frame guides are rollably engaging said track; and said hood and frame rollers are vertically spaced apart on said hood as in said closed position.

3. In a ground supported tractor having a hood, a frame, and a latch to establish a close position of said hood, said hood being sequencially movable by the tractor operator from said closed position through a primary open position and a secondary open position to a removed position after said operator disengages said latch, the improvement including, in combination:

at least one pair of frame tracks secured to opposite sides of said frame, each of said frame tracks having fore and aft ends;

at least one pair of hood tracks secured to opposite sides of said hood, each of said hood tracks having fore and aft ends;

at least one pair of frame guides secured to opposite sides of said frame, each of said frame guides being in close proximity to said fore end of one of said frame tracks and being engaged with and movable on said hood tracks;

at least one pair of hood guides secured to opposite sides of said hood, each of said hood guides being in close proximity to said aft end of one of said hood tracks and being engaged with and movable on said frame tracks;

a pair of cutouts in each of said hood and frame tracks, said cutouts sized to allow passage of the guide engaging said one track;

one of a stop and a detent in one of said hood tracks and said frame tracks, the other of said frame tracks and said hood tracks includes the remainder of said stop and said detent, said stop located forward of said frame guide when said stop is on said frame track and located rearward of said hood guide when said stop is on said hood track, and said detent located rearward of said frame guide when said detent is on said frame track and located forward of said hood guide when said detent is on said hood track;

one of said frame guides and said hood guides establishes one of said primary open and said secondary open position, the remainder of said primary open position and said secondary open position being established by the other of said frame guides and said hood guides, and said removed position being established by said ground supporting said hood;

said primary open position being established by said hood and track guides supporting said hood and said one guide engaging said detent;

said secondary open position being established by said other guide contacting said stop, said engaging guide aligning with said pair of cutouts in one of said hood guides or frame guides and said operator pivoting said hood about said engaging guide until said hood contacts said ground;

said removed position being established by said operator pivoting said hood about said ground engagement, passing said engaging guide through said pair of cutouts in said other of said hood guides or frame guides until said hood is fully supported by said ground; and said frame guides, said hood guides, said frame tracks, said hood tracks and said ground thereby cooperate to support the majority of the weight of said hood in each and during the movement between each of said positions, whereby said operator primarily supplies a horizontal motor force for said hood movement and only a minor portion of said hood weight during said hood movement.

4. The invention of claim 3 wherein:

said hood tracks, said hood guides, said frame tracks, and said frame guides supports the hood in and during said movement between said closed position and said primary open position and during said movement between said primary open position and said secondary open position;

said frame tracks, said hood guides, and said ground support said hood in said secondary open position;

said ground support, said hood during said movement between said secondary open position and said removed position and in said removed position.

* * * * *